United States Patent [19]

Golata et al.

[11] Patent Number: 4,558,727

[45] Date of Patent: Dec. 17, 1985

[54] INTEGRAL TIRE WHEEL

[75] Inventors: John H. Golata, Lansing; David M. Saylor, Holt, both of Mich.; William E. Egan, Tallmadge; Arthur A. Goldstein, Mayfield Village, both of Ohio

[73] Assignee: The Goodyear Tire & Rubber Company, Akron, Ohio

[21] Appl. No.: 637,359

[22] Filed: Aug. 3, 1984

[51] Int. Cl.$^4$ .............................................. B60B 9/00
[52] U.S. Cl. .................................. 152/5; 301/63 PW; 152/323
[58] Field of Search ............... 301/63 PW, 5 R, 63 R; 152/5, 7, 12, 323

[56] References Cited

U.S. PATENT DOCUMENTS

| 2,090,254 | 8/1937 | Eksergian | 301/63 R |
| 2,840,422 | 6/1958 | Main et al. | 301/63 R |
| 2,878,074 | 3/1959 | Cawl | 301/63 PW |
| 4,350,196 | 9/1982 | Hampshire | 152/5 |
| 4,471,999 | 9/1984 | Browne | 301/63 PW |

FOREIGN PATENT DOCUMENTS 1007671  5/1952  France .................................. 152/323

Primary Examiner—David A. Scherbel
Attorney, Agent, or Firm—L. R. Drayer

[57]  ABSTRACT

An integral tire wheel structure (10) comprising an annular generally C-shaped support member (12) having disposed at its radially outer end a ground-engaging tread portion (14), an annular generally C-shaped decoupling member (16) disposed at the radially inner end of the annular support member, and an annular mounting member (18) disposed at the radially inner end of the stress decoupling member. The integral tire wheel being made of material wherein the modulus of elasticity divided by the ultimate strength to the three halfs power is no greater than about 2.6.

12 Claims, 4 Drawing Figures

INTEGRAL TIRE WHEEL

This invention relates to a tire wheel structure and more particularly this invention relates to a non-pneumatic unitary tire wheel structure having a particular cross-sectional configuration.

In the prior art, there has been provided a tire wheel integral structure such as is illustrated in U.S. Pat. No. 4,350,196. It has been found that the durability of this type of structure is dependent upon the stresses at various locations in the structure. High stresses are developed at the bolt circle region and at the radially outer end of the structure. These high stresses reduce the durability of the structure.

Applicants have discovered an improved structure which reduces the stresses developed in the bolt circle region and at the radially outer end thereby improving the durability of the tire wheel structure.

DESCRIPTION OF THE PREFERRED EMBODIMENT

Figure 2:
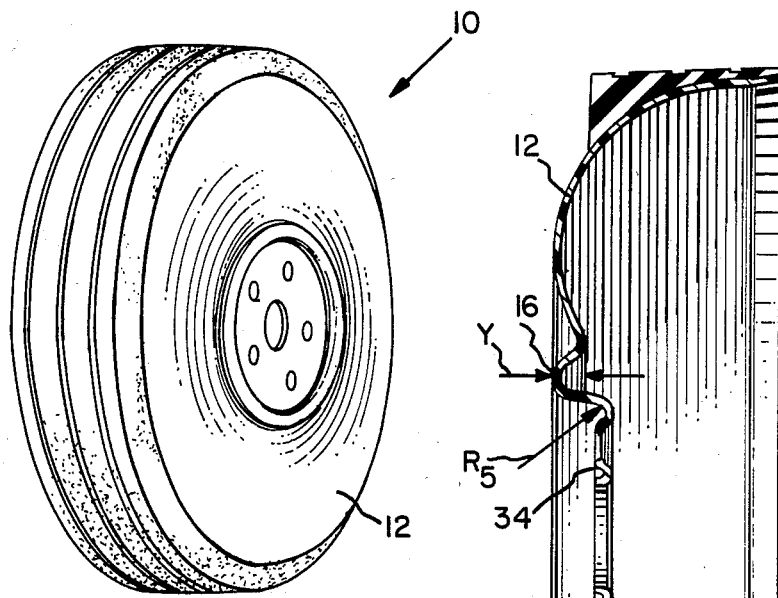
FIG. 2 is a perspective view illustrating the outwardly facing side of the tire wheel structure.
Figure 1:
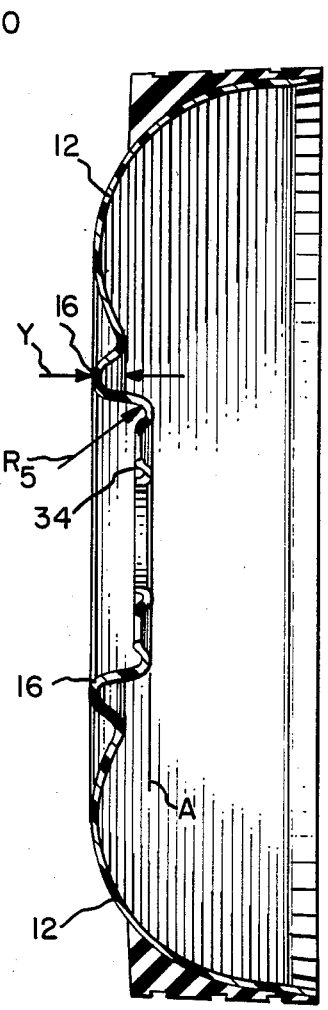
FIG. 1 is a cross-sectional view of a tire wheel structure of the present invention.
Figure 3:
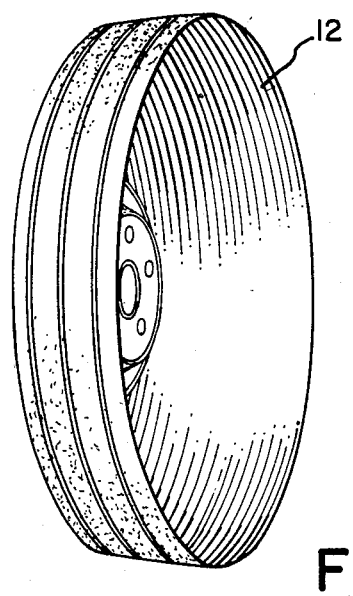
FIG. 3 is a perspective view illustrating the rear side of the tire wheel structure.
Figure 4:
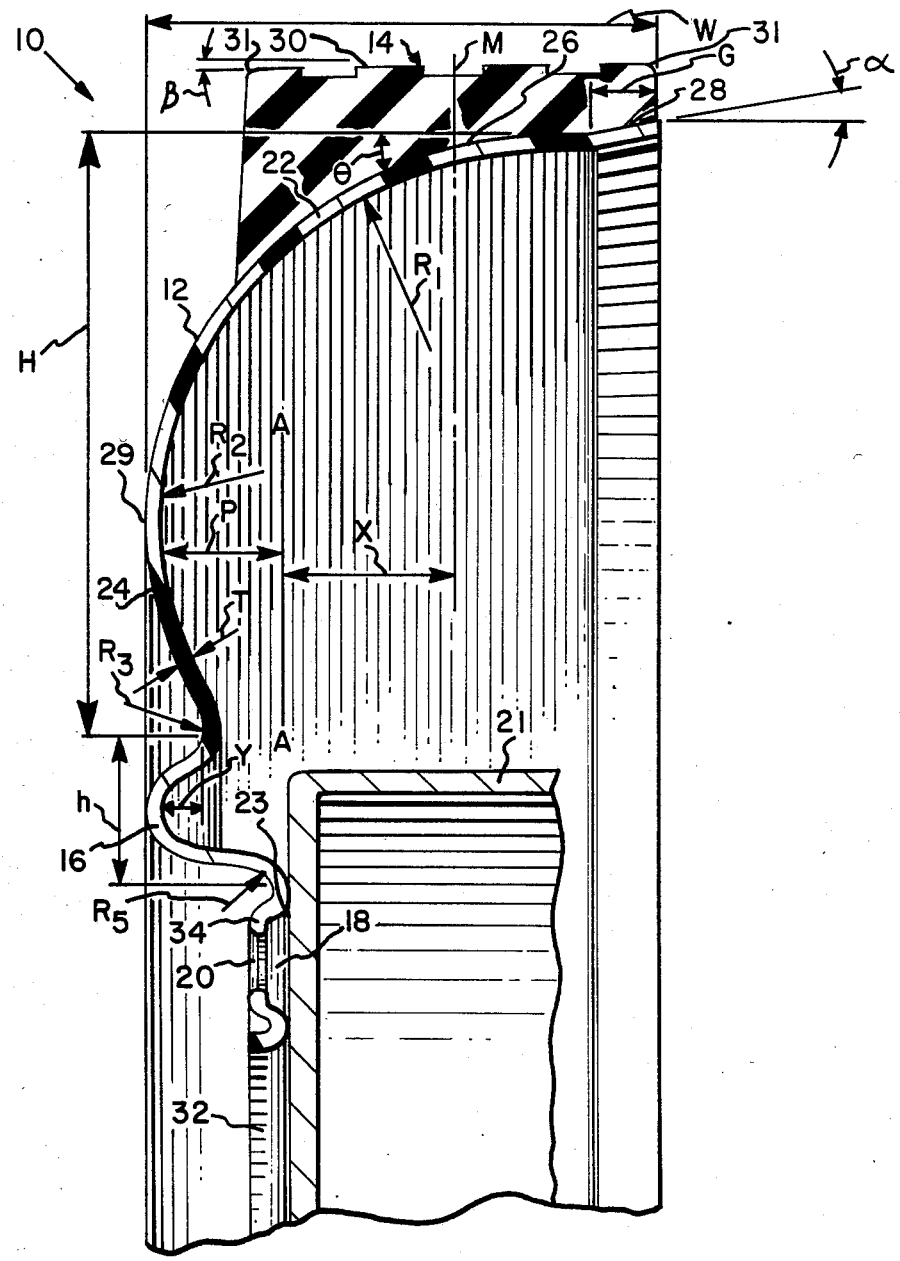
FIG. 4 is an enlarged fragmentary view of the tire wheel structure of FIG. 1.

Referring to FIGS. 1–4, there is illustrated an integral tire wheel 10 made in accordance with the present invention. The integral tire wheel 10 comprises an annular support member 12 having a generally C-shaped cross-sectional configuration, the open end of the C-shape pointing axially inward. The annular support member 12 provides the primary load carrying characteristics of the wheel 10. Disposed on the radially outer surface of annular support member is a ground-engaging tread portion 14 which generally comprises a cured elastomeric material integrally formed with the annular support member 12. The tread portion 14 may be a molded or adhesively applied to the support member 12. In the embodiment illustrated, the tread portion is molded to the support member 12. The ground-engaging tread portion 14 may be provided with any desired tread configuration, for example the ground-engaging tread portion 14 may be provided with a normal tread pattern used in prior art tires or it may be designed specifically for a particular traction application. The radially inner end of annular support member 12 merges into an annular stress decoupling member 16 having a substantially C-shaped cross-sectional shape. The C-shaped annular stress decoupling member is oriented in substantially the same direction as the C-shaped annular support member 12 so that the C-shaped portions of both are directed axially inward with respect to the integral tire wheel. The radially inner end of annular stress decoupling member merges into an annular mounting member 18 having means for allowing securing of said integral tire wheel to axle 21. In the particular embodiment illustrated, there is provided a plurality of bolt holes 20 in annular mounting surface 18 for the allowing of the passing through of a clamping bolt (not shown) which is secured to the axle 21.

For the purposes of this invention, the axially inward surface of the integral tire wheel 10 is that side which faces the vehicle upon which the tire wheel is to be mounted and the axially outer surface faces a direction away from the vehicle.

The annular support member 12 comprises a radially outer portion 22 and a radially inner portion 24. The radius $R_2$ of the radially inner portion 24 is preferably less than the radius $R_1$ of the radially outer portion 22. The radially outer portion has a radius such that the radially outer surface 26 forms an approach angle $\frac{1}{4}$ measured with a plane parallel to the axis of the tire wheel at between 0° and 20°, preferably between 0° and 5°. The approach angle $\frac{1}{4}$ is preferably designed such that the outer surface is substantially parallel to the road surface under normal load conditions. In the particular embodiment illustrated, the approach angle $\frac{1}{4}$ is approximately 3°.

The axially inner end 28 of the radially outer portion 22 is subjected to high stress levels when the integral tire wheel is operated on the vehicle. It is desirable that the stresses be maintained as low as possible in this area to improve the durability of the integral tire wheel 10. Applicants have found that the radially outer and axially inner end portion 28 of the radially outer portion 22 should be flared radially outward at an angle $\alpha$ measured with respect to a plane parallel to the axis of the wheel which is greater than the approach angle $\frac{1}{4}$, preferably at an angle of at least 5° greater than the approach angle $\frac{1}{4}$. In the particular embodiment illustrated, the flared angle $\alpha$ of axially inner portion 28 is about 10.5°. Axially inner end 28 starts its flaring out a distance G from the end point 5 of at least 5% of the maximum overall width W of annular support member 12, preferably of at least 20%. In the particular embodiment illustrated, the distance G is about 13% of width W. Generally, the distance G is preferably no greater than about 25% of width W.

The ground-engaging tread portion in the unloaded condition is such that the radially outer surface 30 forms a very small angle $\beta$ with respect to a plane parallel to the axis of rotation of the tire. It is desirable that the tread angle $\beta$ of the radially outer surface 30 be at least 2°. In the particular embodiment illustrated, the tread angle $\beta$ is approximately 3°. Angle $\beta$ is selected such that when the tire wheel is mounted on the vehicle the radially outer surface 30 will be substantially parallel to the road surface.

The annular support member 12 has a configuration such that the axially outermost point 29 is spaced a distance P from the plane A—A which the mounting member 18 is held against is between zero (0) and one-half the maximum overall width W of annular support member 12, preferably no greater than one-third. In the particular embodiment illustrated, the distance P is approximately 26% of the width W. The distance X between the mid-plane M of the ground-engaging tread portion 14, the mid-plane M being midway between the axially outer ends of the ground-engaging tread portion 14 and the plane A—A is a distance X no greater than one-half the tread width TW and preferably no greater than one-third of the tread width TW.

The providing of a particular configuration to the integral tire wheel is important with regard to providing the appropriate spring rate and supporting capabilities of the structure.

The portion of the integral tire wheel 10 which merges the annular support member 12 and annular stress decoupling member 16 is provided with a radius $R_3$ which is at least equal to the thickness T of the cross-sectional thickness T of the integral tire wheel at that point. The annular stress decoupling member 16 is substantially less in size than the annular support member 12. The annular stress decoupling member 16 reduces the transmission of stresses developed in the annular support member 12 to the annular mounting member 18 thereby substantially reducing the stresses in the area surrounding the bolt holes 20. In the particular embodiment, the vertical height h of decoupling member 16 is approximately 20% of the vertical height H of the annular support member 12. The axial distance Y between the axially outermost point of the axially innermost surface of annular stress decoupling groove 16 and the radially outer surface of the integral tire wheel where annular stress decoupling member 16 merges with annular support member 12 is at least equal to the thickness T, preferably of at least between 30% and 50% of the distance P. In the particular embodiment illustrated, the offset is approximately 41%.

In the particular embodiment illustrated, the annular mounting member 18 is provided with an opening 32 for receiving the end of an axle 21. The mounting member 18 is further provided with an annular raised portion 34 which is spaced from the mounting surface 23 of the axle 21 to which the tire wheel is to be attached so as to provide spring absorbing means when the bolt is passed through the bolt holes 20 for engagement with the mounting surface of the axle. There is provided a radius $R_5$ to that portion of the wheel which merges the annular stress decoupling member 16 with the annular mounting member 18. The radius $R_5$ is preferably equal to at least the thickness T of the integral tire wheel at that point.

While in the particular embodiment, there is illustrated the use of raised portion 34, the present invention does not require the use of one and may be entirely omitted, if desired. However, in the preferred embodiment, raised portion 34 is provided a locking mechanism for securing the wheel to the axle 21.

The material from which the tire wheel is to be made plays an important part in the overall performance characteristics of the integral tire wheel. Under certain design criteria it is desirable to provide an integral tire wheel for use under very limited conditions, for example, for transportation of vehicles from ships to loading docks. In such cases the integral tire wheel should be made of a material wherein the modulus of elasticity E divided by the quantity of ultimate strength S to the three second power $E/S^{3/2}$ is no greater than 2.6. In other circumstances where the integral tire wheel is designed for use for vehicles used under normal road conditions, the integral tire wheel should be made from a material where the value of the relationship $E/S^{3/2}$ is no greater than 0.70 and preferably no greater than 0.50, and most preferably no greater than 0.30. It is important in a vehicle designed for use under normal driving conditions that the material from which the integral tire wheel is made have this value so as to have a sufficient amount of flexibility so as to provide the appropriate durability.

It is possible to construct the subject integral tire wheel of a metal. For example, AISI 4340 steel or aluminum 7075-T6. The AISI 4340 steel has a ratio of E to ultimate strength as previously set forth ($E/S^{3/2}$) of approximately 0.516 and the aluminum 7075-T6 as a modulus of ultimate strength value of 0.539.

For the purposes of this invention, the modulus of elasticity E and the ultimate strength S for metals can be determined from ASTM E6-81 and E8-81 and for all other materials such as plastics or fiber reinforced resins may be determined by ASTM D790.

While certain metals, as previously stated, are able to provide the material properties desired for certain applications, applicant has found that a fiber reinforced resin mixture can provide substantial improvement in strength and durability properties over metal while also maintaining the appropriate durability required for a tire wheel structure made in accordance with the present invention. The particular resin and fiberglass reinforcement used does not form a part of the present invention. The type of fiber reinforced resin to be used is within those skilled in the prior art. For example, U.S. Pat. No. 4,350,196 clearly illustrates a structure being made of a viscoelastic polymeric plastic material having reinforced fibers. Additionally, U.S. Pat. Nos. 4,100,241 and 4,069,000 adequately describe the process upon which structures can be fabricated. As is clearly stated in the foregoing references, the orientation of the fiber reinformement can be varied throughout the structure from the mounting surface to the annular support member in any desired manner.

A non-pneumatic integral tire wheel as taught and described in the present invention is particularly applicable for use as a spare tire which is designed for limited use. Due to the physical configuration of the tire wheel and the material from which it is made, there can be provided a non-pneumatic tire wheel which can be inexpensively made yet provide the functional characteristics similar to high pressure spares known in the prior art yet minimizes the stresses in the structure thereby improving the durability of the structure for its end use.

There are numerous modifications that can be made without departing from the scope of the present invention. For example, as previously stated, the actual resin or fiber reinforcement selected may vary according to the desired properties wanted and the orientation of the reinforcement can be placed so as to further minimize the stresses in the localized areas of the wheel.

I claim:

1. An integral tire wheel supporting structure comprising:
    (a) an annular support member having a generally C-shaped cross-sectional shape, the radially outer portion of said annular support member forming an approach angle in the range of 0° to 20°, the radially outer end of said annular support member having a flared out portion disposed at an angle greater than said approach angle, a ground engaging tread portion disposed on the radially outer surface of said annular support;
    (b) an annular stress decoupling member disposed at the radially inner end of said annular support member and having a substantially C-shaped cross-sectional shape which is substantially less in size than said annular support member, the open end of said C-shaped structure of said annular stress decoupling member is directed in the same general direction as the C-shaped cross-sectional shape of said annular support member;
    (c) the radially inner end of said stress decoupling member merges into an annular mounting member having means for allowing securing of said wheel to an axle;

(d) said integral tire wheel supporting structure being made of a material wherein the relationship between modulus of elasticity (E) and ultimate strength (S) as described by the relationship $(E/S^{3/2})$ is no greater than about 2.6.

2. An integral tire wheel according to claim 1 further characterized in that said annular support member having a radially outer half and a radially inner half wherein the radius of curvature of said radially outer half is greater than the radius of curvature of said radially inner half.

3. An integral tire wheel according to claim 1 further characterized in that the axially outermost point of said annular support member is spaced from the plane containing said mounting member preferably no greater than one-half the overall width of said annular support member, the distance from said plane containing the mounting member to the plane disposed midway between the axially outer ends of said ground-engaging tread portion is no greater than one-half the width of said tread portion.

4. An integral tire wheel according to claim 1 further characterized in that the material wherein the relationship between modulus of elasticity and ultimate strength as described by relationship $(E/S^{3/2})$ is no greater than 0.50.

5. An integral tire wheel according to claim 1 further characterized in that the material wherein the relationship between modulus of elasticity and ultimate strength as described by relationship $(E/S^{3/2})$ is no greater than 0.3.

6. An integral tire wheel according to claim 1 further characterized in that the material wherein the relationship between modulus of elasticity and ultimate strength as described by relationship $(E/S^{3/2})$ is no greater than 0.26.

7. An integral tire wheel according to claim 1 further characterized in that the material wherein the relationship between modulus of elasticity and ultimate strength as described by relationship $(E/S^{3/2})$ is at least 0.02.

8. An integral tire wheel according to claim 7 further characterized in that said wheel comprises a composite structure of fiberglass fibers embedded in epoxy resin.

9. An integral tire wheel according to claim 1 further characterized in that the distance between the axially outermost point of the radially inner surface of said stress decoupling member with respect to the plane passes through the center of radius of said stress decoupling member is no greater than the distance between the axially outermost point of said annular support member and said plane containing the mounting member, preferably between 30% and 50% of said distance.

10. An integral tire wheel according to claim 9 further characterized in that the stress decoupling member has a radius of at least two times the thickness of said wheel and preferably of at least three times.

11. An integral tire wheel according to claim 10 further characterized in that between said stress decoupling member and said mounting member there is provided a linking member having a radius of at least twice the thickness of said wheel.

12. An integral tire wheel according to claim 11, further characterized in that the axial distance between the axially outermost point of the axially inner surface of the annular stress decoupling member and the radially outer surface of the integral tire wheel when the annular stress decoupling member merges with the annular support member is at least equal to the thickness of the thickness of the tire wheel at that point.

* * * * *

UNITED STATES PATENT OFFICE
CERTIFICATE OF CORRECTION

PATENT NO. : 4,558,727
DATED : December 17, 1985
INVENTOR(S) : John H. Golata, David M. Saylor,
William E. Egan and Arthur A. Goldstein It is certified that error appears in the above-identified patent and that said Letters Patent are hereby corrected as shown below:

At column 4, line 44, delete "I claim" and replace therewith --We claim--.

Signed and Sealed this

Twenty-fourth Day of June 1986

[SEAL]

Attest:

DONALD J. QUIGG

Attesting Officer　　　Commissioner of Patents and Trademarks